United States Patent [19]
Plantan

[11] Patent Number: 6,079,312
[45] Date of Patent: Jun. 27, 2000

[54] COMBINED VALVING SYSTEM FOR SPRING BRAKE ACTUATOR

[75] Inventor: Ronald S. Plantan, Charlotte, N.C.

[73] Assignee: Indian Head Industries, Inc., Charlotte, N.C.

[21] Appl. No.: 09/081,457

[22] Filed: May 19, 1998

[51] Int. Cl.$^7$ ............................................. F01B 1/00
[52] U.S. Cl. ............................. 91/172; 91/178; 91/523; 92/63
[58] Field of Search ........................... 91/172, 178, 523; 92/63; 303/71; 188/170

[56] References Cited

U.S. PATENT DOCUMENTS 5,286,095  2/1994  Sell et al. ................................. 303/9
5,671,654  9/1997  Plantan .

Primary Examiner—Edward K. Look
Assistant Examiner—Thomas E. Lazo
Attorney, Agent, or Firm—Howard & Howard

[57] ABSTRACT

An improved spring brake actuator includes an improved valve housing which incorporates pressure test points into the air supply, and further incorporates an anti-compounding valve. By incorporating the anti-compounding valve and test points directly into the valve manifold, the inventive spring brake actuator reduces the number of separate parts. The anti-compounding valve is operable to insure that there will be no compounding of the braking force.

11 Claims, 5 Drawing Sheets

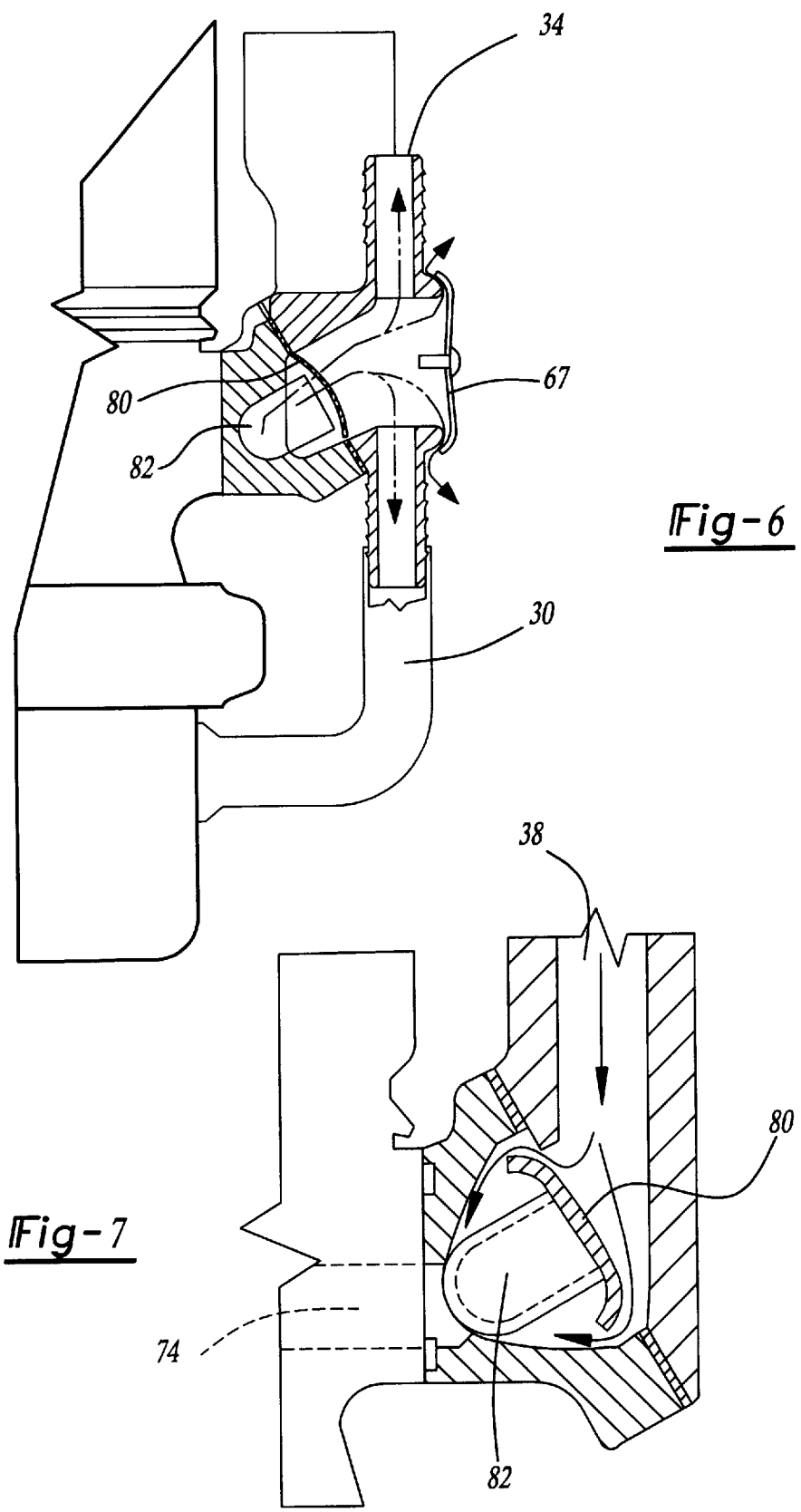

COMBINED VALVING SYSTEM FOR SPRING BRAKE ACTUATOR

BACKGROUND OF THE INVENTION

This invention relates to a valving system for a spring brake actuator which incorporates an anti-compounding valve, and pressure test points into a valve assembly for communicating and exhausting pressurized air to the spring brake chambers.

Spring brake actuators are utilized by heavy vehicles to control the application of the brake. Generally, two brake chambers are housed together and connected to a vehicle brake. One brake chamber is supplied with air to actuate the brake when the truck operator steps on the brake pedal. This side, known as the "service brake" is supplied with air to force a push rod outwardly of a brake chamber and set the vehicle brake.

A second brake chamber is positioned atop the service brake chamber and supplied with its own push rods and a large power spring. This brake chamber, known as the parking or emergency brake chamber, selectively forces its push rod against the service push rod to set the brake whenever the supply of pressurized air to the parking brake chamber is exhausted. Thus, should the air brake system air supply fail, the power spring will move the spring brake push rod outwardly to set the brake. Also, when the vehicle is parked, a parking brake valve is actuated to exhaust air from the parking brake chamber allowing the power spring to move its push rod outwardly and set the brake.

In some instances, when the parking brake is set, the driver may step on the brake pedal. This would cause both chambers of the brake to be actuated. The force on the brake would be undesirably high. This is known as "compounding," and is undesirable. To address the problem of compounding brake force, many air brake systems are provided with valves in the air supply lines which prevent the dual application of both the service and emergency brakes.

Another feature of spring brakes is the provision of "test points." These are connections on the supply lines for the pressurized air at which the pressure of the air supply can be tested.

Prior to this invention, both the anti-compounding valves and the test points have been supplied as separate parts which are not incorporated into the body of the spring brake actuator.

SUMMARY OF THE INVENTION

In a disclosed embodiment of this invention, a valving system is provided for supplying pressurized air to both the service and spring brake chambers, and further exhausting the air. The valving system is preferably provided with a simple anti-compounding valve incorporated into the supply and exhaust lines.

An anti-compounding valve is positioned over a valve manifold which supplies pressurized fluid to both the service and parking chambers from respective pressurized air sources. There is a first tap adjacent the supply to the parking brake chamber which selectively communicates with the service brake chamber. A second tap communicates the service brake chamber to exhaust.

When pressurized fluid is supplied to the parking brake, the valve is forced downwardly and closes the first tap from the parking brake chamber to the service brake chamber. Air can pass around the flap valve into the parking brake chamber to hold the parking brake in its released position. When air is supplied to the service brake chamber to set the vehicle brake, the valve is forced to close the second tap between the service brake chamber and exhaust, and the pressurized air moves around the flap valve into the service chamber. However, the first tap between the service brake chamber and the parking brake chamber may be opened. If the parking brake chamber is supplied with pressurized air, gas from the service brake chamber will not move into the parking brake chamber. On the other hand, should the parking brake chamber be exhausted of pressurized air, as would be the case if compounding would otherwise occur, then the pressurized gas would move from the service brake chamber and into the parking brake chamber to hold the parking brake at its released position. This simple valve is incorporated directly into the supply line of the brake actuator, and thus reduces the number of parts to supply the anti-compounding effect.

In addition, the valve housings are also supplied with the test point structures. Thus, the test points are also provided without the necessity of separate fluid components.

These and other features of the present invention can be best understood from the following specification and drawings, the following of which is a brief description.

BRIEF DESCRIPTION OF THE DRAWINGS

FIG. 6 is a cross-sectional view showing one operational stage.

FIG. 7 is a cross-sectional view showing another operational stage.

DETAILED DESCRIPTION OF A PREFERRED EMBODIMENT

Figure 1:
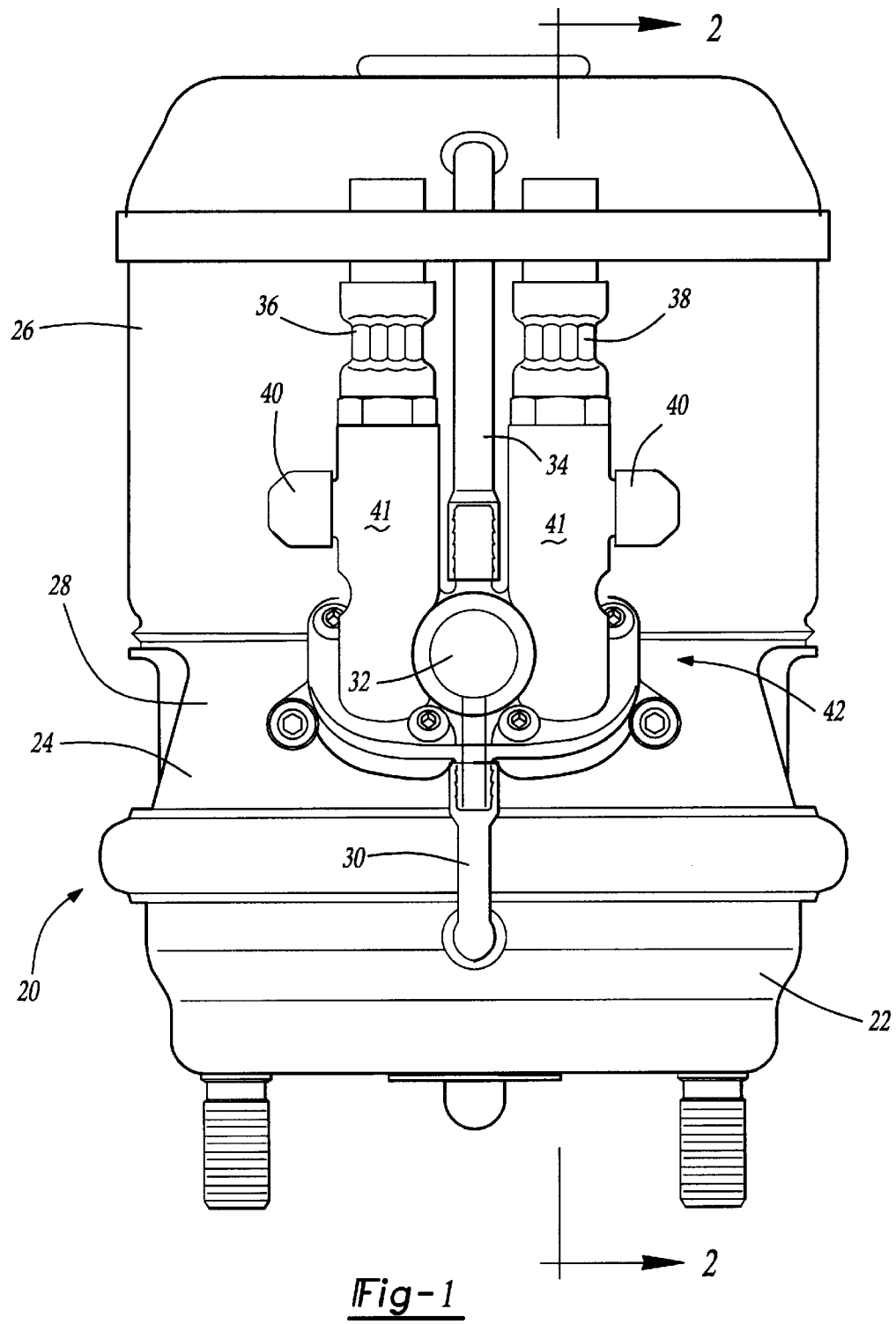
FIG. 1 is a side view of a spring brake actuator incorporating the inventive valve structure.

FIG. 1 shows a spring brake actuator 20 incorporating a service brake non-pressurized chamber 22 connected to the service brake side of a center housing 24, and a parking brake chamber 26 connected to the parking brake side 28 of the center housing. A breather tube 30 connects the non-pressurized side of the service brake chamber to an exhaust valve 32, which is in turn communicated to a breather tube 34 leading to the non-pressurized side of the parking brake chamber. Air supply lines 36 and 38 supply pressurized air to the service and spring brake chambers. Test points 40 are incorporated into an upper manifold portion 41 of a valve chamber 42 which is fixed to the side of the housing of the brake chamber. The valve chamber 42 includes angled upper and lower manifolds such as shown in U.S. Pat. No. 5,671, 654. Although the present invention is shown as a piston brake, the invention would have equal application to a diaphragm brake.

Figure 2:
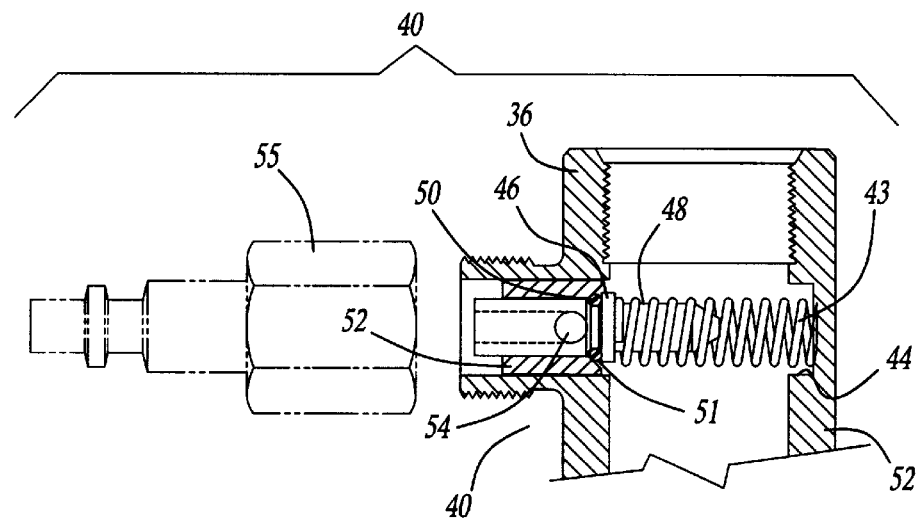
FIG. 2 is a cross-sectional view of a test point incorporated into the present invention.

FIG. 2 shows further details of the test point 40. A spring 43 sits on a seat 44 within manifold 41, and which communicates to lines 36 and 38. A plastic valve 46 has a forward end 48 which receives spring 43. The spring 43 biases the valve 46 to a position wherein an O-ring 50 seals the valve against a valve seat 51 on a bushing 52. A fluid opening 54 extends through a portion of the center of the valve 46.

When a test fitting 55 is mounted onto the valve 46 to test the pressure within line 36, the valve 46 is moved against the force of the spring until the opening 54 communicates with the internal passage of line 36 or 38. In this way, the pressure within the supply line may be easily tested. The present invention eliminates the need of the separate test point mounted at some other location by incorporating the test point directly into the valve housing.

Figure 3:
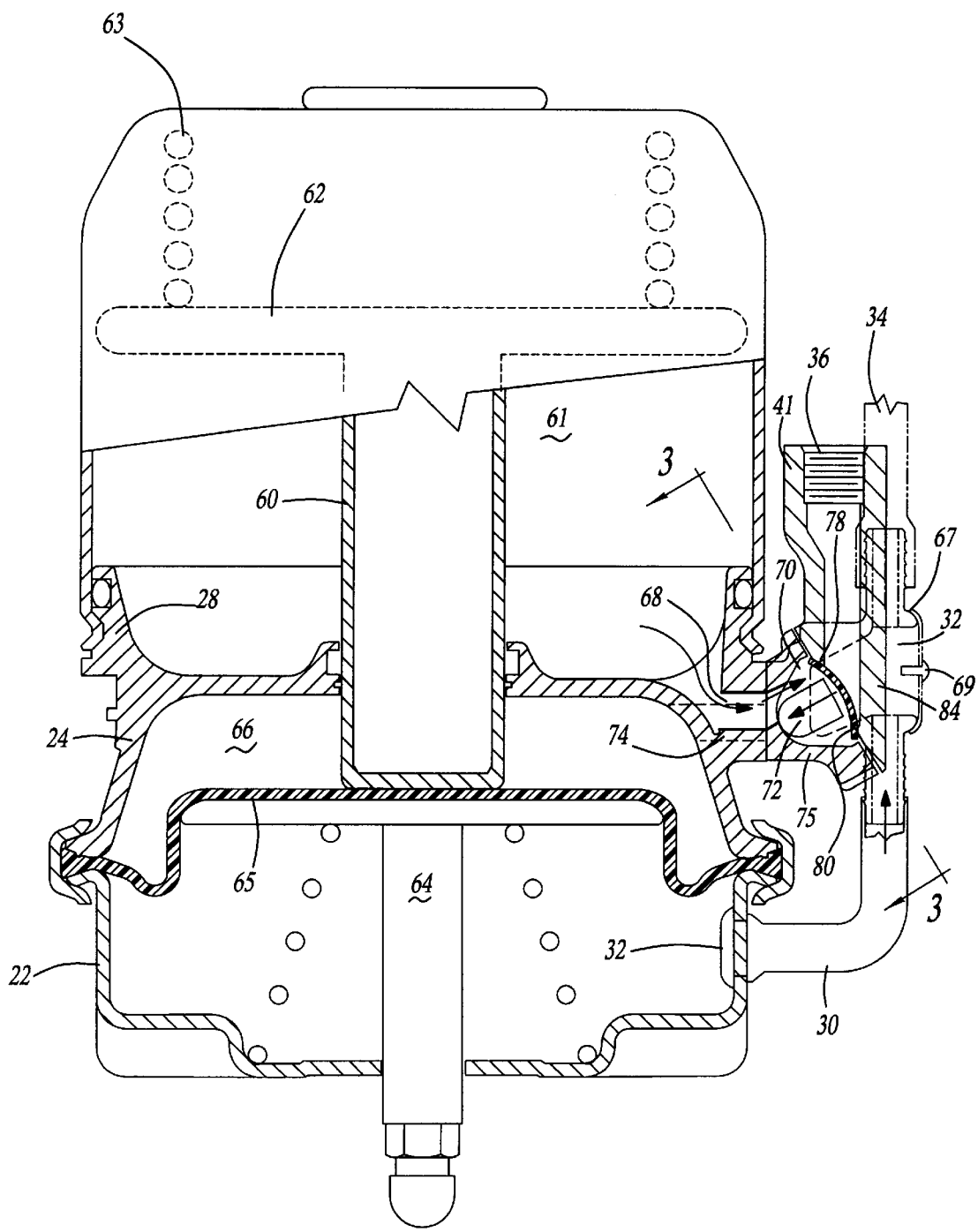
FIG. 3 is a cross-sectional view through a portion of the brake shown in FIG. 1.

Valve housing 42 is further unique in containing an integral anti-compounding valve. A basic explanation of the operation of a spring brake actuator will be given with reference to FIG. 3 to understand the operation of the anti-compounding valve. Push rod 60 is movable within a parking brake chamber 61. Pressurized air is supplied into chamber 61 to hold an actuator, such as piston 62 upwardly. When the air is exhausted from the chamber 61, then the piston 62 may move downwardly to a position such as shown in FIG. 3. A powerful spring 63, shown schematically, forces the piston 62 and push rod 60 downwardly when air is exhausted from chamber 61. Although a piston is shown, the piston 62 may be replaced by a diaphragm, as known.

A second push rod 64 is movable in conjunction with a diaphragm 65 in a service chamber 66. When air is supplied to chamber 66, diaphragm 65 and push rod 64 may move outwardly to set a brake, not shown. Alternatively, when push rod 60 is moved downwardly it forces diaphragm 55 and push rod 64 downwardly to set the brake.

As shown, exhaust valve 32 incorporates a flap valve 67 pinned at 69 to a valve housing. Should there be a pressure within breather tube 30 or 34 which exceeds atmospheric, flap valves 67 will open and allow the air to exhaust. Otherwise, air will move between the non-pressurized chambers of the service and spring brake through the breather tubes 30 and 34.

As shown, a supply opening 68 leads into chambers 61 to supply pressurized gas to the parking brake chamber. A similar opening 74 leads into the service brake chamber 66.

FIG. 3 is through a portion of the valve 42 including an anti-compounding valve. The valve 42 includes an upper manifold 41 and a lower manifold 75, with the anti-compounding structure between the manifolds. The connection and shape of manifolds 41 and 75 is basically as shown in U.S. Pat. No. 5,671,654. The anti-compounding valve includes chamber 70 which communicates with opening 68, and selectively communicates with a first tap 72 communicating with opening 74. A flap valve 80 is shown for selectively closing the first tap 72, as will be explained below. Chamber 70 communicates with the supply port 36 supplying air to the spring brake parking chamber 61.

Figure 4A:
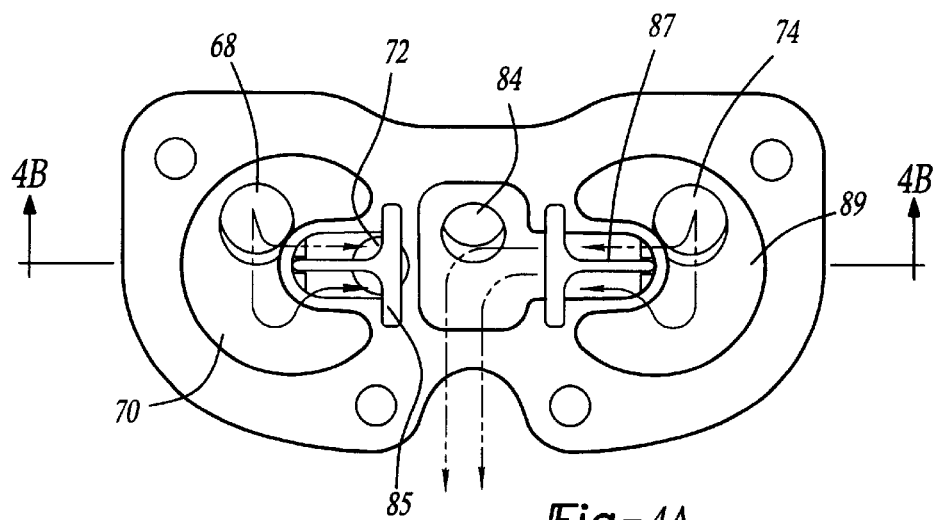
FIG. 4A is an end view of an anti-compounding valve.

As shown in FIG. 4A, the opening 68 communicates with chamber 70 which in turn selectively communicates with a first tap 72 which communicates with port 74. An exhaust port 84 selectively communicates with the opening leading to the flap valve 67. A tap 87 selectively communicates a chamber 89 communicating with the port 74 to the exhaust 84.

Figure 4B:
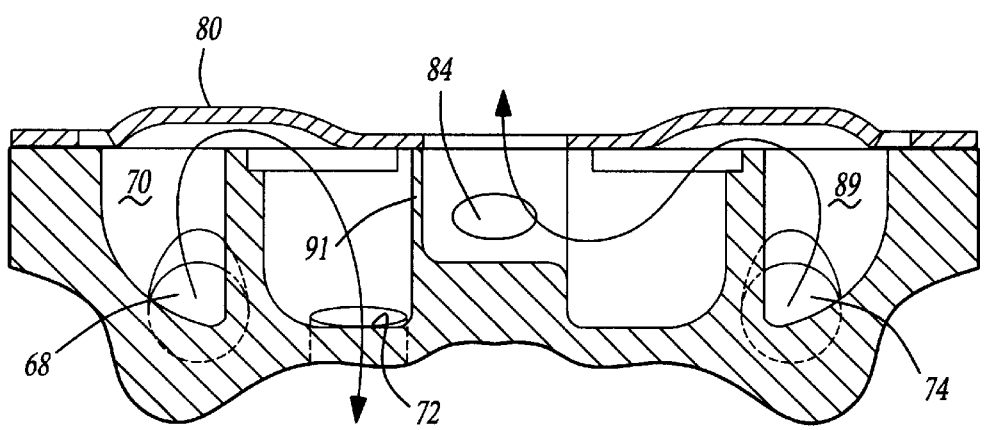
FIG. 4B is a cross-sectional view along lines B—B of FIG. 4A.

As shown in FIG. 4B, a wall 91 separates chambers 70 and 89. Gas passing into chamber 70 can bow valve 80 upwardly such that air can pass between port 68 and first tap 72. Similarly, air can pass between port 74 and exhaust 84.

Figures 5A, 5B:
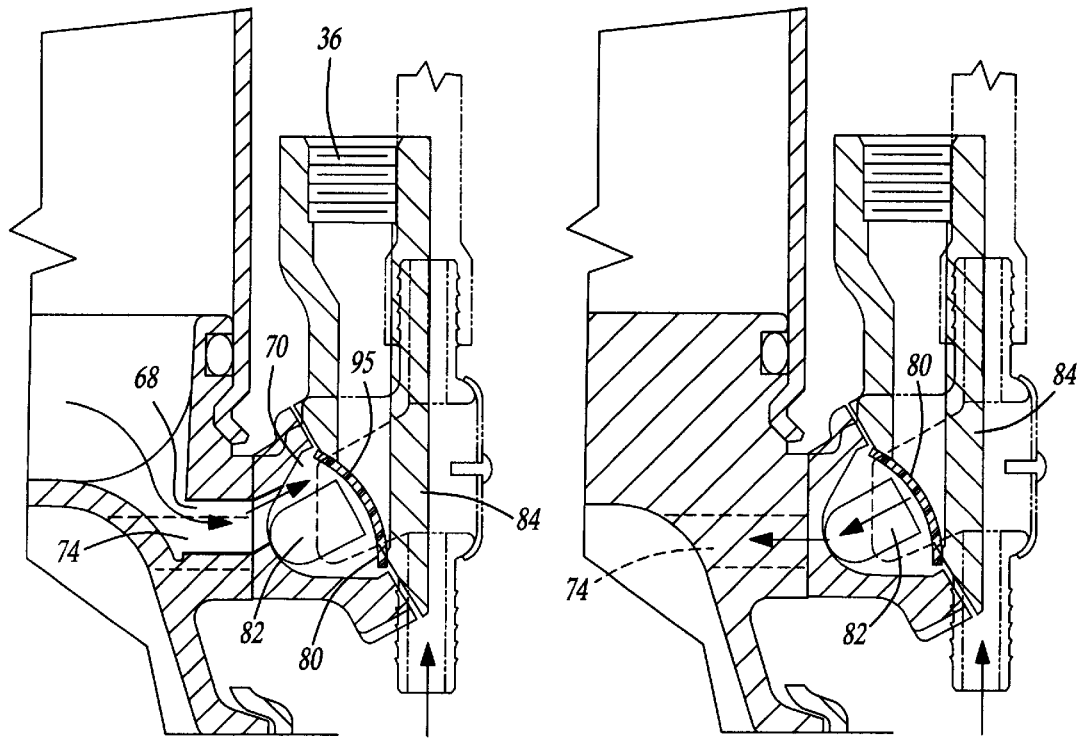
FIG. 5A is a cross-sectional view through one portion of the valve shown in FIG. 4A.
FIG. 5B is a view through the second portion of the valve shown in FIG. 4A.

FIG. 5A shows the operation of the valve when the parking brake chamber is exhausted. As shown in FIG. 5A, air will pass outwardly through port 68, and into chamber 70. As shown at 95, this air will bow the valve 80 upwardly to seal against the supply port 36. Thus, the air exhausting the port 68 moves into the first tap 72, and then into the service brake chamber. As shown in FIG. 5B, at the same time, this air will be at a greater pressure than the air otherwise in the service chamber. It will thus move outwardly of port 74 into chamber 89, flex valve 80 upwardly, and move outwardly through the exhaust 84. Thus, when the spring brake chamber is exhausted, air is dumped to atmosphere, although it does communicate with the service chamber on its way to exhaust.

Figure 5C:
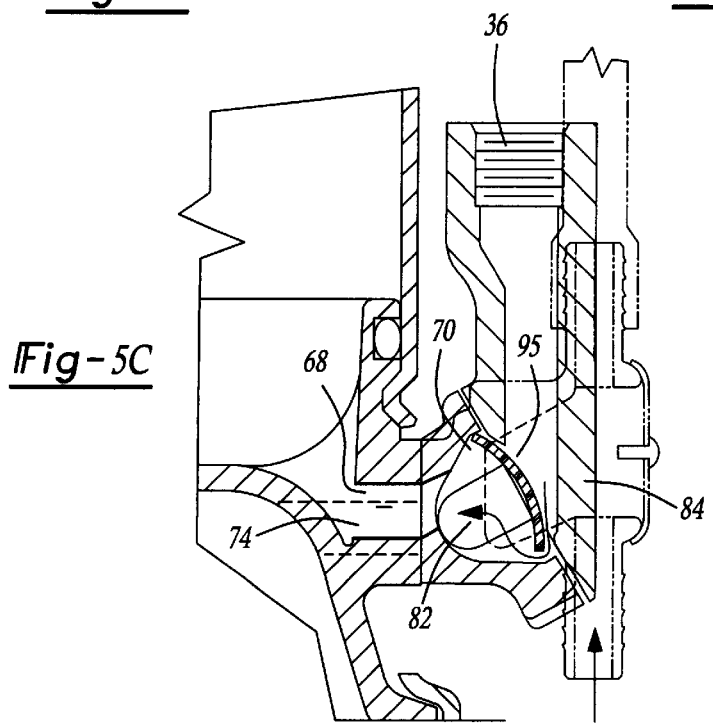
FIG. 5C shows another operational state.

On the other hand, as shown in FIG. 5C, when air is supplied to the spring brake chamber, the valve 80 is forced downwardly to close the tap 82 and allow air to flow into the opening 68. Thus, in this condition, the air will not pass into the service brake chamber.

FIG. 6 shows the exhaust of air as the service brake is exhausted. The air may pass through valve 67, or into the breather tubes 30 and 34.

FIG. 7 shows the application of pressure to the service chamber. As shown, air passes into port 74 from its supply 38. The valve 80 is forced downwardly to close the tap 87, and block flow to exhaust. This pressurized gas then moves through port 74, to force the service brake push rod outwardly to the actuated position. At the same time, the first tap 72 will also be receiving this pressurized air. If the parking chamber 61 is not supplied with pressurized air, then this pressurized air will force the flap valve 80 to the position shown in FIG. 4B. Gas will then pass from the tap 72 into the opening 68 and bias the parking brake piston 62 to its released position. In this way, whenever pressurized fluid is supplied to the service brake chamber, the system automatically insures there will not be a compounding of the braking effect since pressurized gas will be sent into the parking brake chamber to bias the parking brake piston at the released position.

The present invention incorporates several brake valving components into a single valve for the brake actuator, and is an improvement over the prior art by simplifying the required parts. As can be appreciated, the manifolds meet at an angled surface and the valve is captured between the two manifolds.

Although a preferred embodiment of this invention has been disclosed, a worker of ordinary skill in the art would recognize that certain modifications come within the scope of this invention. For that reason, the following claims should be studied to determine the true scope and content of this invention.

What is claimed is:

1. A spring brake actuator comprising:
   a parking brake having an actuator and a power spring biasing said actuator in a first direction, a parking brake chamber on an opposed side of said actuator from said power spring, and a push rod moving with said actuator to set a brake;
   a service chamber actuator defining a service chamber and supplied with pressurized fluid selectively on one face to force a push rod outwardly to set a brake;
   an air supply system for supplying pressurized air selectively to said parking and service brake chambers; and
   a valving system attached to the body of the spring brake actuator for insuring the pressurize air will not be sent simultaneously to both said service and parking brake chambers.

2. A spring brake actuator as recited in claim 1, wherein said valving system incorporates a first valve manifold bolted to an outer housing on said brake actuator, and a second valve manifold bolted to said first valve manifold, a flexing valve disk positioned between said first and second manifolds, and said valve disk insuring air will be supplied to said parking brake chamber when air is supplied to said service brake chamber.

3. A spring brake actuator as recited in claim 2, wherein said valve system is provided with a tap between said parking brake chamber and said service brake chamber, and said disk selectively closing said tap when pressurized air is supplied through a pressurized source to said parking brake chamber but allowing flow from said service brake chamber into said parking brake chamber if pressurized air is supplied to said service brake chamber but not to said parking brake chamber.

4. A spring brake actuator as recited in claim 3, wherein a tap is provided from said service brake chamber to exhaust, said tap being closed when pressurized air is supplied to said service brake chamber, but allowing flow from said service brake chamber to said exhaust when air is being exhausted from said parking brake chamber.

5. A spring brake actuator as recited in claim 2, wherein said pressurized air supply includes two separate pressurized air supplies incorporated into said second manifold, and test points mounted within said second manifold for testing the pressure within each of said first and second supplies.

6. A spring brake actuator as recited in claim 5, wherein said test points include a valve which is spring biased to a closed position but which is movable to an actuated position wherein the pressure within said manifold may be tested.

7. A spring brake actuator as recited in claim 1, wherein a breather tube communicates non-pressurized chambers associated with both said parking and service brake chambers through a passage which also communicates with an exhaust valve.

8. A spring brake actuator as recited in claim 7, wherein said exhaust valve includes a flapper valve for exhausting gas from said breather tubes to atmosphere when the pressure within said breather tubes exceeds atmospheric.

9. A spring brake actuator as recited in claim 8, wherein an exhaust from said parking and service brake pressurized chambers also selectively communicates with said exhaust valve.

10. A spring brake actuator comprising:

a parking brake having an actuator and a power spring biasing said actuator member in a first direction, a parking brake chamber on an opposed side of said actuator from said power spring, and a push rod moving with said actuator to set a brake;

a service chamber actuator defining a service chamber and supplied with pressurized fluid selectively on one face to force a second push rod outwardly to set a brake; and a first pressurized gas supply for supplying pressurized gas to said parking brake chamber and a second pressurized gas supply for supplying gas to said service brake chamber, a valve manifold attached to said spring brake actuator housing, said valve manifold incorporating test points for selectively testing the pressure within said first and second supplies.

11. A spring brake actuator as recited in claim 10, wherein said test points include a valve which is spring biased to a closed position but which is movable to an actuated position wherein the pressure within said manifold may be tested.

* * * * *